(12) United States Patent
Gindele et al.

(10) Patent No.: US 9,669,598 B2
(45) Date of Patent: Jun. 6, 2017

(54) VEHICLE TOP

(71) Applicant: Dr. Ing. h.c. F. Porsche Aktiengesellschaft, Stuttgart (DE)

(72) Inventors: Vanessa Gindele, Ditzingen (DE); Norbert Schneider, Grossbettlingen (DE); Wolfgang Braun, Albershausen (DE); Remigijus Uswald, Stuttgart-Stammheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 19 days.

(21) Appl. No.: 14/805,968

(22) Filed: Jul. 22, 2015

(65) Prior Publication Data

US 2016/0031181 A1 Feb. 4, 2016

(30) Foreign Application Priority Data

Jul. 29, 2014 (DE) .................. 10 2014 110 646

(51) Int. Cl.
| | | |
|---|---|---|
| *A41D 27/24* | (2006.01) | |
| *B32B 5/06* | (2006.01) | |
| *B32B 3/04* | (2006.01) | |
| *B32B 5/02* | (2006.01) | |
| *B32B 7/12* | (2006.01) | |

(Continued)

(52) U.S. Cl.
CPC .................. *B32B 5/06* (2013.01); *B32B 3/04* (2013.01); *B32B 5/024* (2013.01); *B32B 5/26* (2013.01); *B32B 7/12* (2013.01); *B32B 37/12* (2013.01); *B32B 37/18* (2013.01); *B32B 38/0012* (2013.01); *B60J 7/1226* (2013.01); *D05B 23/00* (2013.01); *D05B 35/06* (2013.01); *B32B 2038/008* (2013.01); *B32B 2307/102* (2013.01);

(Continued)

(58) Field of Classification Search
CPC ..... Y10T 428/24198; Y10T 428/24033; Y10T 428/24215; Y10T 428/24207; A41D 27/24; B60J 10/10; B32B 3/04
See application file for complete search history.

(56) References Cited

U.S. PATENT DOCUMENTS 1,618,809 A * 2/1927 Byron .................... A43B 23/25
112/419
2,785,003 A 11/1954 Zaravsey
(Continued)

FOREIGN PATENT DOCUMENTS

DE 41 12 256 10/1992
DE 42 34 811 4/1994
(Continued)

OTHER PUBLICATIONS

German Search Report of Mar. 24, 2015.

*Primary Examiner* — Alexander Thomas
(74) *Attorney, Agent, or Firm* — Gerald E. Hespos; Michael J. Porco; Matthew T. Hespos

(57) ABSTRACT

A production method for a top cloth with a number of layers for a top of a vehicle, in which the number of layers is sewn to a border of the top cloth with a first layer of a binding band by means of a seam, wherein the binding band is folded and is guided with a second layer over the seam and around the border of the top cloth and is connected to an inner side of the top cloth such that the seam is concealed by the second layer, and wherein the second layer is arranged seamlessly on the first layer.

9 Claims, 3 Drawing Sheets

(51) Int. Cl.
*B32B 37/12* (2006.01)
*B32B 37/18* (2006.01)
*B32B 38/00* (2006.01)
*B60J 7/12* (2006.01)
*D05B 23/00* (2006.01)
*B32B 5/26* (2006.01)
*D05B 35/06* (2006.01)

(52) U.S. Cl.
CPC ....... *B32B 2605/00* (2013.01); *B32B 2605/12* (2013.01)

(56) References Cited

U.S. PATENT DOCUMENTS

| | | | |
|---|---|---|---|
| 3,010,114 A | * | 11/1961 | Lipschultz ............. A41D 27/24 112/417 |
| 3,167,349 A | | 1/1965 | Young et al. |
| 5,269,582 A | | 12/1993 | Mueller et al. |
| 6,022,064 A | | 2/2000 | Robbins et al. |

FOREIGN PATENT DOCUMENTS

| | | |
|---|---|---|
| DE | 299 20 731 | 4/2000 |
| DE | 199 00 909 | 7/2000 |
| JP | 2008-143245 | 6/2008 |

* cited by examiner

VEHICLE TOP

CROSS REFERENCE TO RELATED APPLICATION

This application claims priority under 35 USC 119 to German Patent Appl. No. 10 2014 110 646.6 filed on Jul. 29, 2014, the entire disclosure of which is incorporated herein by reference.

BACKGROUND

1. Field of the Invention

The invention relates to a production method for a top cloth of a top of a vehicle and to a corresponding top for a vehicle.

2. Description of the Related Art

Open vehicles, such as convertibles, are protected from an environment, and therefore against rain penetrating a vehicle interior by a top.

A differentiation is made between flexible or soft tops and hard tops. Soft tops optionally may comprise various insulation layers. Hard tops have rigid, foldable roofs. Repeating folding movements during the opening and closing of a flexible or soft top subject the respective components of the corresponding top to a heavy loading. Cracks may occur and/or seams may be damaged in flexible materials of the top, such as in a respective top cloth, due to shearing movements and frictional forces.

JP 2008-143245 A discloses a piping that is sewn to an outer casing of a top to produce a rain channel. As a result, top components arranged below the piping are protected against loading by, for example, rainwater.

U.S. Pat. No. 6,022,064 describes a tension cable that is guided by a tab in a top cloth so that tensile forces can be asserted by the tension cable on the top cloth and the top cloth can be brought into a specified shape.

DE 41 12 256 C2 discloses a collapsible or folding top for vehicles. The top has a top material with shaped strips made of flexible material sewn directly onto respective border edges of profiles. The profile strips are adapted in shape to the profiles and are screwed to the profiles. A binding band comprises a seam region of the top cloth and is sewn with a continuous seam onto the top cloth.

DE 42 34 811 C2 discloses a convertible top with a piping-type rain channel.

Against this background, it is an object of the invention to provide a top with a top cloth with a lower seam that runs along a rain channel with increased positioning accuracy in relation to the prior art and appropriately exacting tolerances. Therefore the seam is protected from direct contact with environmental influences and the corresponding top lasts for a long time and is resistant to environmental influences.

SUMMARY

The invention relates to a production method for a top cloth for a top of a vehicle. The top cloth has plural layers sewn together with a first layer of a binding band at a border of the top cloth to form a seam. A second layer of the binding band is folded over the first layer and the seam and is folded further around the border of the top cloth. The second layer is connected to an inner surface of the top cloth. Thus, the seam is concealed by the second layer.

The term top, as used herein, refers to a soft top.

The production method of the invention arranges a binding band on a lower border of a top cloth. The binding band initially is sewn with a first layer to the top cloth, i.e. is pierced, and then the binding band is folded over or bent in such a manner that, after folding over or bending, the first layer is surrounded by a second layer running parallel to the first layer of the binding band. Therefore, the seam that was introduced to connect the binding band to the top cloth is shielded toward the outside by the second layer of the binding band. The second layer covers the first layer without a seam introduced on the outside. For example, the first layer can be bonded adhesively to the second layer.

The second layer of the binding band shields the seam from external influences, such as rain and permits an accurately fitting termination or transition of the top cloth to a piping rain channel arranged on the top cloth. Thus, a neat and elegant transition of the top cloth to the piping rain channel is achieved. Additionally, uneven or inconsistent stitching formed during connection of the binding band to the top cloth can be covered.

The binding band enables the top cloth to slide harmoniously in relation to edges of the vehicle or a linkage of the top during an opening or closing movement since the seam no longer comes directly into contact with the vehicle or the linkage of the top and the seam thereby is prevented from chafing.

The top cloth may comprise plural layers, including at least one layer that defines an outer skin. Further layers can be insulation layers and/or decoration layers formed, for example, from cotton, for example in the interior of a vehicle.

The binding band may partially surround all of the layers of the top cloth, i.e. is arranged around all of the layers. Therefore, the binding band surrounds the top cloth both toward the outside and toward the inside at a lower edge of the top cloth.

The binding band may compress plural layers of the top cloth and therefore prepares the top cloth for sliding or entering into a narrow construction space since different layers of the top cloth are pressed against one another by tensile forces imparted via the binding band. As a result, a cross-sectional area is reduced in comparison to a conventional seam, and a thinner border region is produced.

Noises can be avoided because of the harmonious sliding made possible on the basis of the binding band and entry of the top cloth into narrow construction spaces or along sharp edges of the vehicle or along framework parts of the top. As a result, the ease of using the corresponding vehicle can be increased.

The binding band on the top cloth avoids a potential penetration of water through the seam of the top cloth into the interior of the vehicle since perforations made in the top cloth by the seam are concealed by the binding band and inflowing water or rain is kept away from the perforation points caused by the seam.

Both the binding band and the top cloth may be produced from plastic, acrylic material or Talon material, i.e. polyacrylonitrile with an intermediate butyl rubber coating.

The binding band may be bonded adhesively to an inner side of the top cloth. Adhesively bonding the binding band to the top cloth produces a connection of the binding band to the top cloth that is extensive and therefore is particularly stable in relation to tensile and compressive forces. Therefore, the binding band can act on the top cloth and compresses the top cloth so that a cross-section of the top cloth is reduced and the top cloth can enter or slide into small or narrow construction spaces.

The second layer of the binding band may be bonded adhesively to the first layer of the binding band to cover the seam introduced for connecting the first layer of the binding band to the top cloth. Thus, the seam introduced into the first layer of the binding band is surrounded or encased by the second layer of the binding band, and the seam introduced into the first layer of the binding band is shielded in relation to environmental influences, such as, rain or solar radiation.

The second or outer layer of the binding band may be bonded adhesively to the border of the top on its way around the border of the top. Connecting or adhesively bonding the second layer of the binding band over a complete section around the border of the top, i.e. to the first layer of the binding band, to the lower border of the top and to an inner side of the top, achieves a stable, tension- and compression-proof connection of the binding band to the top or the top cloth.

The seam introduced into the first layer of the binding band is introduced into the binding band or the top cloth on an outer side. Sewing the first layer of the binding band to the top cloth on an outer side of the top cloth, enables the seam to be introduced into the first layer of the binding band in such a manner that the first layer bears tightly or in a form-fitting manner against a piping arranged on the top, and therefore there is a form-fitting transition of the piping to the binding band. Thus, water that may have accumulated in a piping rain channel formed by the piping and the top is prevented from passing to the intermediate space between binding band and top cloth.

A form-fitting connection is formed between piping and binding band or the seam introduced into the first layer of the binding band of the outer side of the top cloth. The binding band conceals the seam and any possible irregularities in the seam and enables an esthetically attractive shaping of the border or of the lower side of the top.

A fold, i.e. a folded-over edge, of the first layer to the second layer of the binding band may be provided in a form-fitting manner or flush with a piping surrounded by the top cloth. A flush or form-fitting connection of the binding band to the top cloth holds and fixes the piping in position and ensures that the piping rain channel is suitable for catching and conducting rain water even upon repeated deformation of the top cloth.

The piping may be incorporated into the binding band. Fusion or a material connection between piping and binding band incorporates a plastics pipe into the binding band, for example, during the operation of adhesively bonding the first layer to the second layer of the binding band. Thus, a particularly elegant and functional transition between piping or piping rain channel and the lower border of the top or top cloth can be provided.

The binding band may be composed of the same material as an outer skin of the top. Additionally, both the binding band and the piping rain channel may be composed of an identical material to the outer skin to ensure an elegant transition between the binding band and the piping or the further outer skin of the top. The outer skin of the top is prepared or pretreated for contact with a respective environment. Thus, a corresponding material is readily suitable for the tasks of the binding band.

The invention also relates to a top for a vehicle, in which a number of layers, such as, an outer skin, insulation material and decoration layers in the vehicle interior, are sewn to a border of a top cloth. The border is surrounded by first and second layers of a binding band. The first layer of the binding band is secured to the border by a seam. The second layer of the binding band is guided over the seam and around the border of the top cloth and is adhesively bonded to an inner side of the top cloth such that the seam is concealed by the second layer.

The top of the invention may be used with vehicle that may be a watercraft. Watercrafts frequently have foldable tops. Thus, the top of the invention is suitable for covering or lining parts of a watercraft because of the above-described binding band. The particularly well-protected seam points of the top of the invention, accommodate considerable loadings even during operation of a watercraft despite aggressive materials, such as salt water, are prevented from penetrating into or through the top cloth and, as a result, into the watercraft itself.

Further advantages and refinements of the invention emerge from the description and the attached drawings. The features mentioned above and those explained below can be used not only in the respectively stated combination, but also in different combinations or on their own without departing from the scope of the invention.

DETAILED DESCRIPTION

Figure 1:
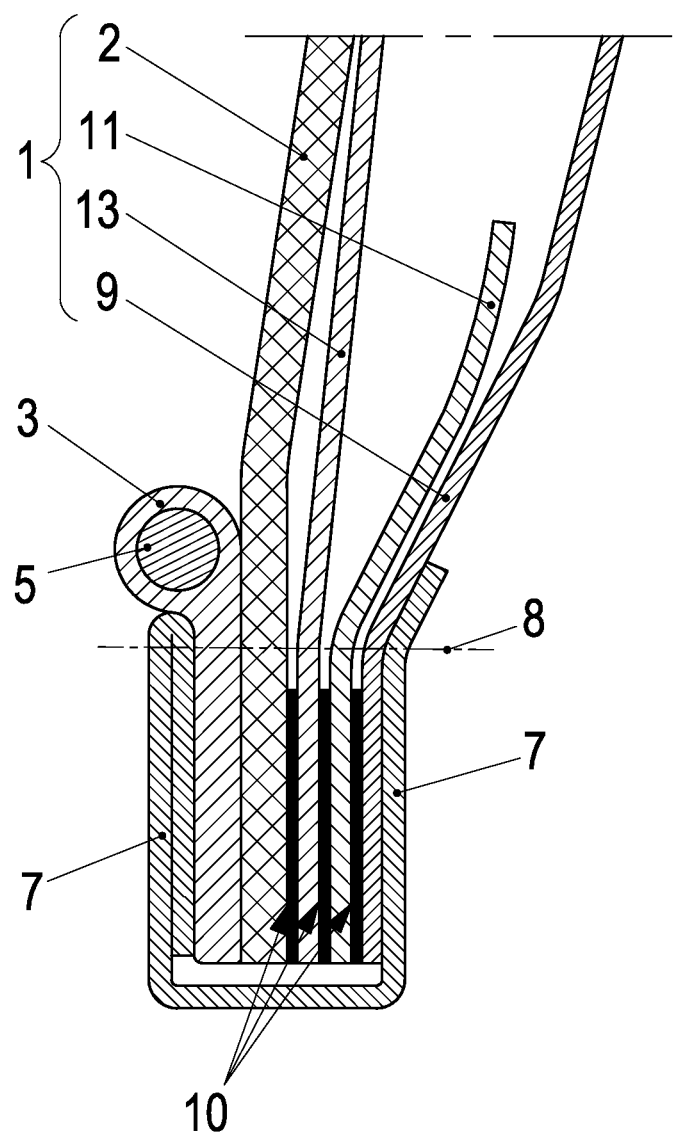
FIG. 1 shows a top cloth according to the prior art.

A piping 3 with a piping core 5 made, for example, of polyethylene is arranged on the outside of a top cloth 1, as shown in FIG. 1 and comprises, for example, a textile fiber 2 and a plurality of insulation layers 11, 13. Both the top cloth 1 and the piping 3 are at least partially surrounded by a binding band 7.

According to the prior art, the binding band 7 is connected to the piping 3 and the top cloth 1 by a seam 8, and therefore the seam 8 is visible from the outside and from the inside and the seam 8 completely penetrates the binding band 7 on both sides of the top cloth 1.

Figure 2:
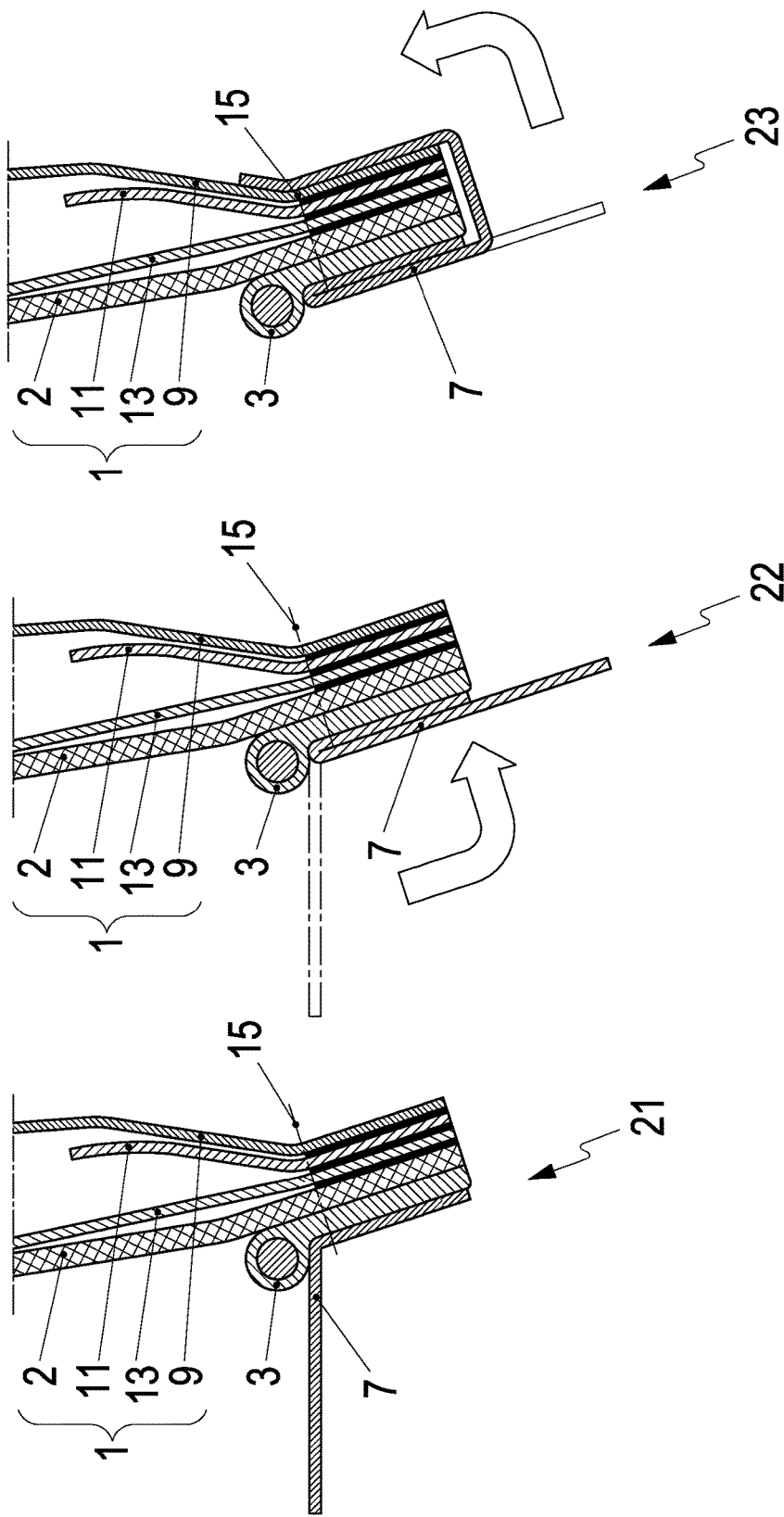
FIG. 2 shows various steps of a possible configuration of the production method according to the invention.

A production method illustrated in FIG. 2 shows how the binding band 7 is arranged around the piping 3 and the top cloth 1, i.e. around the textile fiber 2, the insulation layers 11 and 13 and an inner layer 9.

In a first step 21, the binding band 7 is arranged flush below the piping 3 and is sewn to the piping 3 or the top cloth 1 via a seam 15. As soon as the seam 15 connects the binding band 7 to the piping 3 and the top cloth 1, the binding band 7 is turned over or folded and is guided in a second layer along the first layer of the binding band 7, which layer is arranged with the seam 15 on the piping 3 or the top cloth 1, and, for example, is adhesively bonded to said first layer, as illustrated in step 22. Finally, the binding band 7 is guided around the top cloth 1 and the insulation layers 11 and 13 and the inner layer 9 and is connected to the inner layer 9 of the top cloth 1, i.e., for example, is likewise adhesively bonded, as illustrated in step 23.

The covering arising in step 23 by means of the binding band 7 clearly shows how the seam 15, which runs through a first layer of the binding band 7, connects the binding band 7 to the top cloth 1 and to the piping 3. The seam 15 furthermore is covered by a second layer of the binding band 7 and hence is shielded from an environment. This means that the seam 15 runs merely through the first layer of the binding band 7 and does not penetrate the second layer, but rather is shielded to the outside or surrounded by the second layer of the binding band 7.

Figure 3:
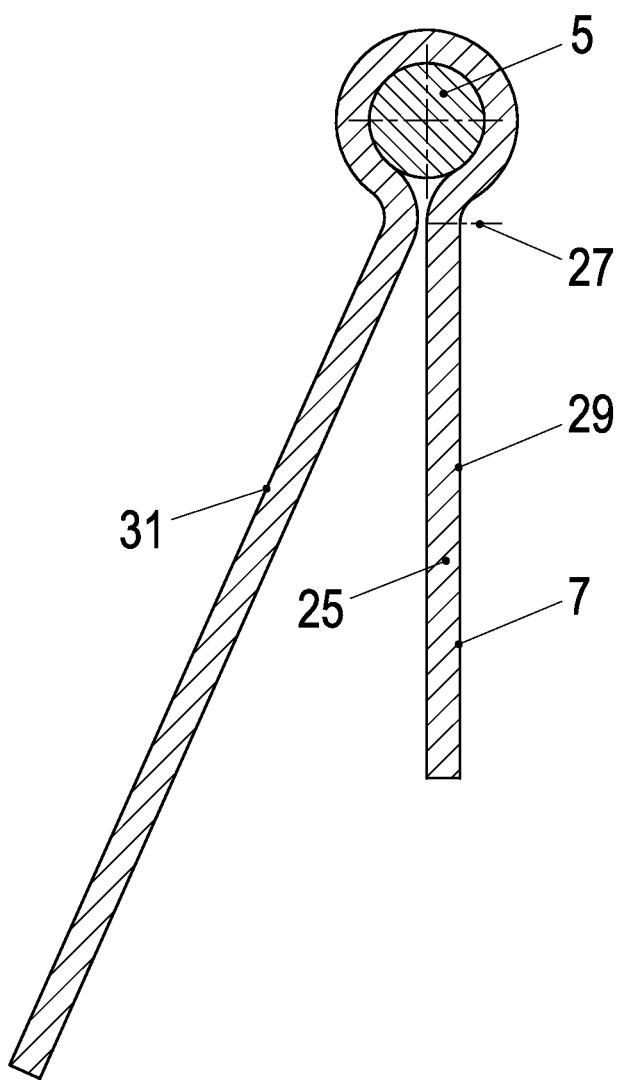
FIG. 3 shows a possible configuration of the binding band provided according to the invention, in which the piping is integrated into the binding band.

The possible refinement of the binding band 7 that is illustrated in FIG. 3 shows an arrangement of the piping core 5 within the binding band 7. By means of an arrangement of the piping core 5, in which the piping core 5 is wound around by the binding band 7, an additional layer for the provision of the piping 3 during the production of a top can be saved. For this purpose, a first layer 29 of the binding band 7 is sewn to a top cloth (not illustrated) by means of a seam 27. The binding band 7 then is guided around the piping core 5. Subsequently, that part of the binding band 7 that is guided around the piping core 5 is guided back again as the second layer 31 of the binding band 7, i.e. along the first layer 29 and around the top cloth (not illustrated). In a final step, the second layer 31 of the binding band 7 is guided around the first layer 29 and the top cloth, is connected to the top cloth and/or the first layer 29.

In order to connect the second layer 31 of the binding band 7 robustly to the first layer 29 of the binding band 7, the second layer 31 can be adhesively bonded to the first layer 29, for example at an adhesive bonding point 25. The second layer 31 of the binding band 7 delimits the top cloth or a piping formed as described above from the binding band 7 and the piping core 5 toward the outside in a form-fitting manner and without a visible seam.

What is claimed is:

1. A production method for a top cloth with a number of layers for a top of a vehicle, the method comprising the steps of:
    providing a piping, a top cloth, and a binding band, each of the piping, the top cloth and the binding band having spaced apart first and second edges, the second edge of the piping including a piping core;
    layering the piping, the top cloth, and binding band together so that the first edges of the piping, the top cloth, and the binding band are substantially aligned, and at least a portion of the binding band is flush with the piping;
    sewing the binding band to an outer surface of the piping and the top cloth in proximity to a border of the layers of the top cloth and thereby forming a seam;
    folding the binding band approximately 180 degrees over to form a first fold adjacent the piping core so that a portion of the binding band adjacent the first fold overlies the seam and the first fold has a thickness that is smaller than a diameter of the piping;
    folding the binding band around the first edges of the piping, the top cloth, and the binding band to form second and third bends of approximately 90 degrees each; and
    connecting the binding band to an inner surface of the top cloth so that the seam is concealed by the binding band.

2. The production method of claim 1, wherein the step of connecting the binding band to the inner side of the top cloth comprises adhesively bonding the binding band to the inner side of the top cloth.

3. The production method of claim 2, wherein the step of folding the second edge of the binding band over the first edge of the binding band further comprises adhesively bonding a portion of the binding band adjacent to the first edge to another portion of the binding band.

4. The production method of claim 3, further comprising adhesively bonding the binding band to an edge of the top cloth between the inner and outer surfaces of the top cloth.

5. The production method of claim 1, in which the seam is introduced into the top cloth on an outer side.

6. The production method of claim 1, wherein the folding position of the binding band bears against the second end of the piping.

7. The production method of claim 1, in which the binding band and an outer skin of the top are made from identical material.

8. A top for a vehicle, comprising:
    a top cloth having plural layers including at least an inner layer and an outer layer joined together at a border of the top cloth so that at least a first edge of the at least inner layer and outer layer are aligned with each other;
    a piping having a first edge substantially aligned with the first edges of the at least inner and outer layers of the top cloth, and a second edge remote from the first end and including a substantially cylindrical piping core; and
    a binding band extending between a first edge substantially aligned with the first edges of the top cloth and the piping and second edges, the binding band including at least a first, a second, a third, and a fourth section arranged sequentially between the first and second edges, wherein
        the first section of the binding band extends in surface-to-surface contact with the piping,
        the second section of the binding band is folded approximately 180 degrees over the first section at a position substantially aligned with the piping core so that a first fold between the first and second sections bears against the piping core, and a thickness of the first fold is smaller than a diameter of the piping core;
        the third section of the binding band is folded approximately 90 degrees from the second section and faces the first edges of the top cloth, the piping, and the binding band; and
        the fourth section of the binding band is folded approximately 90 degrees to extend along the inner layer of the top cloth.

9. The top as claimed in claim 8, in which the vehicle is a watercraft.

* * * * *